US006594244B1

United States Patent
Chang et al.

(10) Patent No.: US 6,594,244 B1
(45) Date of Patent: Jul. 15, 2003

(54) DATA COMMUNICATION DEVICE AND METHOD IN A CDMA COMMUNICATION SYSTEM

(75) Inventors: Hoon Chang, Seoul (KR); Hee-Won Kang, Songnam-shi (KR); So-Min Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/480,712

(22) Filed: Jan. 7, 2000

(30) Foreign Application Priority Data

Jan. 7, 1999 (KR) .................................. 99-873

(51) Int. Cl.[7] .......................... H04B 7/216; G06F 11/00; H03M 13/00
(52) U.S. Cl. ...................... 370/335; 370/474; 714/701; 714/758; 714/799
(58) Field of Search ................................ 370/241, 242, 370/320, 335–441, 470, 471, 474, 469, 389, 473; 714/701, 776, 779, 746, 752, 758, 791, 799, 754, 753, 761

(56) References Cited

U.S. PATENT DOCUMENTS

| | | | | |
|---|---|---|---|---|
| 5,251,215 A | * | 10/1993 | Dravida et al. | 370/471 |
| 5,524,116 A | * | 6/1996 | Kalmanek et al. | 714/799 |
| 6,098,188 A | * | 8/2000 | Kalmanek et al. | 714/746 |
| 6,317,430 B1 | * | 11/2001 | Knisely et al. | 370/470 |

* cited by examiner

Primary Examiner—Alpus H. Hsu
Assistant Examiner—Afsar M Qureshi
(74) Attorney, Agent, or Firm—Dilworth & Barrese, LLP

(57) ABSTRACT

A method for arranging CRC (Cyclic Redundancy Code) bits within logical transmission units (LTUs) in a CDMA communication system having a physical channel frame comprised of a plurality of LTUs arranged in line, with a physical layer CRC field and tail bits arranged after the LTUs. Each LTU includes a payload and a LTU CRC field for detecting errors in the LTU payload. In the CRC bit arranging method, the CRC field included in odd-numbered LTUs are arranged after the payload and the CRC field included in even-numbered LTUs are arranged before the payload in such a manner that a LTU CRC field of an even-numbered LTU is adjacent to a LTU CRC field of an odd-numbered LTU connected to said even-numbered LTU.

17 Claims, 7 Drawing Sheets

DATA COMMUNICATION DEVICE AND METHOD IN A CDMA COMMUNICATION SYSTEM

PRIORITY

This application claims priority to an application entitled "Data Communication Device and Method in CDMA Communication System" filed in the Korean Industrial Property Office on Jan. 7, 1999 and assigned Ser. No. 99-873, the contents of which are hereby incorporated by reference.

BACKGROUND OF THE INVENTION

1. Field of the Invention

The present invention relates generally to a CDMA communication system, and in particular, to a device and method for assembling and de-assembling or decomposing a logical transmission unit (LTU) used for efficient data transmission in a radio environment.

2. Description of the Related Art

In general, CDMA-2000 systems have a supplemental channel that operates at a high data rate. Although the following description will use the example of a supplemental channel in a CDMA-2000 system, the present invention can apply to any system having two or more cyclic redundancy code (CRC) fields in a transmission frame, as will become clear in the description below. FIG. 1 shows the protocol layer structure of the supplemental channel in the CDMA-2000 system. Although the CDMA-2000 system has several different types of upper layer entities, FIG. 1 shows an RLP (Radio Link Protocol) layer 111 for the upper layer entity, by way of example. The RLP layer 111 assembles data received from an upper layer into an RLP frame. A multiplex sublayer 112 receives the RLP frame(s) from the RLP layer 111 and assembles RLP frame into MuxPDUs. (Multiplex sublayer Protocol Data Units). A supplemental channel physical layer element 113 receives the MuxPDUs from the multiplex sublayer 112 and assembles the MuxPDUs into a supplemental channel (SCH) frame, which is transmitted over the physical channel.

The supplemental channel physical layer element 113 is the physical layer of the supplemental channel and refers to the hardware structure of the supplemental channel. The supplemental channel physical layer element 113 receives data transmitted from the multiplex sublayer 112, fills the payload of a SCH frame with the received data, generates CRC (Cyclic Redundancy Code) bits, and then attaches the CRC bits and a tail of 8 zero (0) bits to the end of the SCH frame. Once assembled, the SCH frame is encoded by the supplemental channel physical layer element 113, and then transmitted to the receiving side.

In FIG. 1, the multiplex sublayer 112 receives transmission data from an upper layer entity, in this case RLP, and fills MuxPDUs with the received data. The multiplex sublayer 112 writes specific information in the MuxPDU header so that the multiplex sublayer on the receiving side will know to which upper layer entity the payload of the received MuxPDU should be transferred. When it is not possible to fill the SCH frame payload with any more MuxPDUs, a particular type of MuxPDU is used to fill the remaining space in the physical frame. Herein, this particular type of MuxPDU will be referred to as a fill-MuxPDU or padding (bits).

The above process of assembling MuxPDUs from RLP frames, and then assembling SCH frames from MuxPDUs is performed during transmission. Below, the process of de-assembling or decomposing SCH frames on the receiving end is described.

First, upon receipt of a SCH frame, the supplemental channel element 113 performs decoding on the received SCH frame. After decoding, the supplemental channel element 113 calculates the CRC bits for the received payload, and then compares the calculated CRC bits with the CRC bits received with the SCH frame. As noted above, the received CRC bits were calculated and transmitted by the supplemental channel element on the transmission side. If the CRC bits are identical to each other, the supplemental channel element 113 provides the multiplex sublayer 112 with the payload of the received supplemental channel frame along with information indicating that the payload passed the CRC check. If the CRC bits are different from each other, the supplemental channel element 113 provides the multiplex sublayer 112 with the payload of the received supplemental channel frame along with information indicating that the payload failed the CRC check. Upon receipt of information indicating the payload passed the CRC check, the multiplex sublayer 112 examines the provided payload from the beginning to separate the MuxPDUs. On the other hand, upon receipt of information indicating the payload failed the CRC check, the multiplexer sublayer 112 discards the provided payload and informs each upper layer entity that an error frame has been received.

FIG. 2 shows the structure of the SCH frame which is transmitted over the supplemental channel. Referring to FIG. 2, the SCH frame is comprised of a payload, a 16-bit physical layer CRC, and 8 tail bits indicating termination of the SCH frame for encoding. As indicated above when the transmission procedure was described, the payload is filled with several MuxPDUs and the remainder is filled with fill-MuxPDUs (padding bits).

In any radio transmission system, burst errors occur in the data stream. In the CDMA-2000 system, where the SCH frame is transmitted using a convolutional encoding method, burst errors occur from place to place inside the payload of the SCH frame, because of the long length of the SCH frame. In this case, because there are many MuxPDUs in the SCH frame, there will be some MuxPDUs that have no errors as well as the one or more MuxPDUs that have errors. It is much more efficient to separate the error-less MuxPDUs instead of discarding them, and transfer all of them to the upper layer as correctly received data.

In order to exploit this efficiency, the MuxPDUs are grouped into larger units, called logical transmission units (LTUs). The LTU has a specific size and has a CRC field for indicating whether or not the LTU has an error. Therefore, when the physical layer CRC check on the SCH frame shows an error, the multiplex sublayer 112 won't discard the entire payload. Instead, the multiplex sublayer 112 separates out the individual LTUs in the SCH frame payload, and performs an LTU CRC check on each individual LTU. When there is an error, the multiplex sublayer 112 discards the LTU. Otherwise, when there is no error, the multiplex sublayer 112 separates out the MuxPDUs included in the LTU and provides the data to the upper layers.

Using this LTU function, each LTU has a CRC field, which is additionally filled into the SCH frame payload. This means that the room in the payload for MuxPDUs is reduced by the size of the CRC field. Therefore, there is a need for a method of maximizing the number of MuxPDUs for transmission while maintaining the existing MuxPDU size. In addition, it is proposed that a 16-bit, or 2-byte, CRC field should be used for byte alignment in arranging the LTU in the payload of the physical channel frame. The preferred embodiment of the present invention proposes a 12-bit LTU CRC field so that more MuxPDUs can be placed in the payload of the SCH frame. In addition, the bytes in the MuxPDUs retain byte alignment, even though the CRC field is 1 and a ½ bytes long.

SUMMARY OF THE INVENTION

It is, therefore, an object of the present invention to provide a device and method for effectively arranging a CRC field in a CDMA communication system.

It is another object of the present invention to provide an LTU assembling device and method which retains byte alignment without reducing the size of a MuxPDU, thereby increasing efficiency, in a communication system.

It is another object of the present invention is to provide a byte alignment method using at least two logical CRC fields in one physical frame.

To achieve the above and other objects, there is provided a method for arranging CRC fields within logical transmission units, (LTUs) in a CDMA (Code Division Multiple Access) communication system having a physical channel frame comprised of a plurality of LTUs arranged in line, followed by the physical layer CRC field and tail bits. Each LTU has a payload containing data and a LTU CRC field for error correction of the data. In the LTU CRC arranging method, the LTU CRC field included in odd-numbered LTUs is placed in the back of the LTU and the CRC field included in even-numbered LTUs is placed in the front of the LTU. Because each odd-numbered LTU is followed by an even-numbered LTU, the two CRC fields form a three byte boundary between adjacent LTUs, resulting in the retention of byte alignment.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 3:
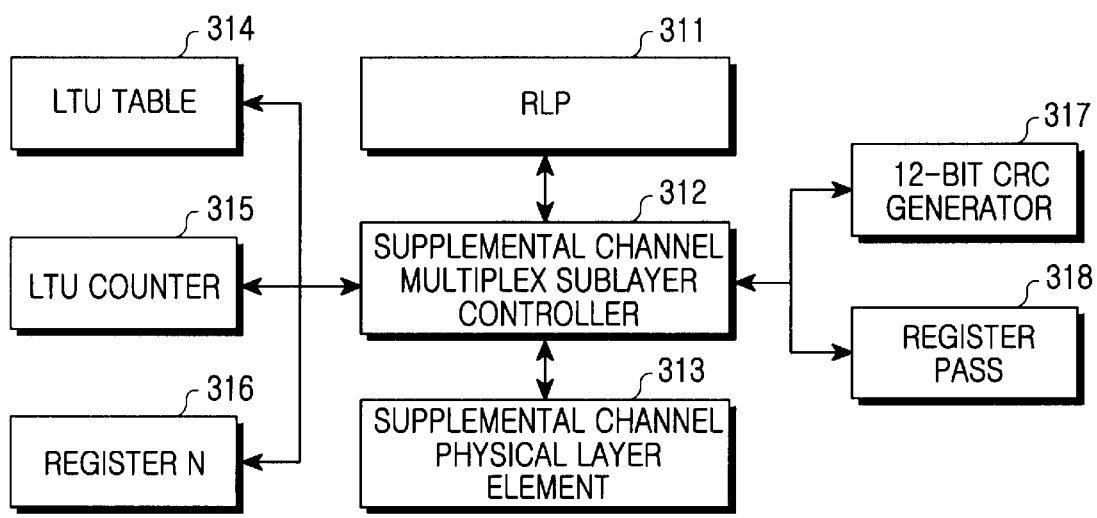
FIG. 3 is a diagram illustrating a multiplex sublayer which assembles and de-assembles logical transmission units (LTUs) in a CDMA communication system according to an embodiment of the present invention.

FIG. 3 shows a multiplex sublayer which assembles and de-assembles LTUs in a CDMA communication system according to an embodiment of the present invention. The structure of FIG. 3 applies to both mobile stations and base stations.

Figure 1:
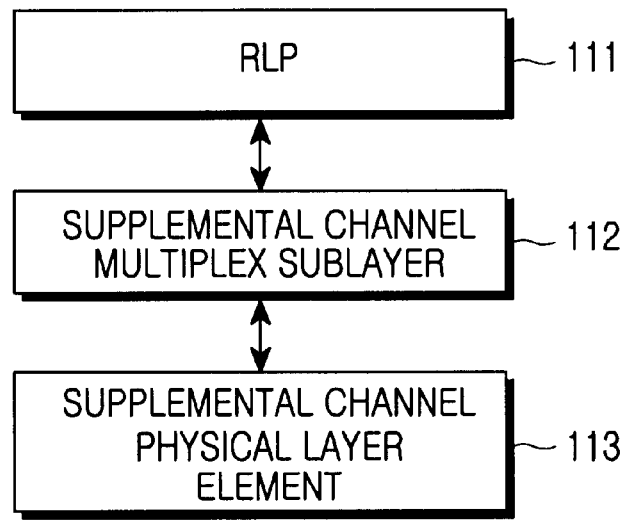
FIG. 1 is a diagram illustrating the protocol stack for a supplemental channel in a CDMA communication system.
Figure 2:
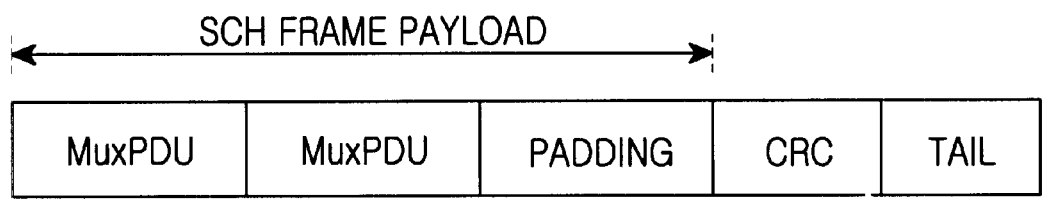
FIG. 2 is a diagram illustrating the structure of a physical channel frame in a CDMA communication system.

Referring to FIG. 3, the supplemental channel element 313 and the upper layer entity, in this case, RLP 311, have the same operation as those of FIG. 1. The remaining 6 elements comprise the multiplex sublayer according to an embodiment of the present invention. All the functions of this embodiment of the present invention are performed by a multiplex sublayer controller 312. FIG. 3 shows 5 newly added devices. An LTU table 314 stores the number of LTUs which can fill the payload of a SCH frame according to different data rates of the supplemental channel. An example of what a LTU table would store is given below in Table 1. If the LTU function is not to be used, the number of LTUs is set to '0'. An LTU counter 315 counts the current number of LTUs in the LTU assembling and de-assembling process. A first register (REGISTER N) 316 stores the number of LTUs which can fill the payload of a SCH frame according to the current data rate of the transmitted or received supplemental channel. A CRC generator 317 generates a 12-bit CRC field by receiving the bits in the payload of the LTU. Here, the multiplex sublayer controller 312 directs the CRC generator 317 to generate the CRC field for the payload of the LTU, in the LTU assembling and de-assembling process. A second register (REGISTER PASS) 318 stores the CRC check results of the physical layer, provided from the supplemental channel element 313. For example, when the SCH frame has passed the CRC check, the second register 318 stores '1', and, if the SCH frame does not pass the CRC check, the second register 318 stores '0' and provides the CRC check results to the multiplex sublayer controller 312.

Table 1 below shows an example of the LTU table 314.

TABLE 1

| Data Rate of SCH (bps) | LTU Number |
|---|---|
| 9600 | 0 |
| 19200 | 0 |
| 38400 | 2 |
| 76800 | 4 |
| 153600 | 8 |
| 14400 | 0 |
| 28800 | 0 |
| 57600 | 2 |
| 115200 | 4 |

In Table 1, for a data rate of 9600 bps, the LTU number is 0. This means that the payload of the SCH frame is filled in the normal fashion, without using the LTU function, i.e., using only MuxPDUs without attaching the LTU CRC.

Further down in Table 1, for a data rate of 38400 bps, the LTU number is 2. This means that two LTUs, each one comprised of MuxPDUs and an LTU CRC, are used to fill the payload of the SCH frame.

Figure 4:
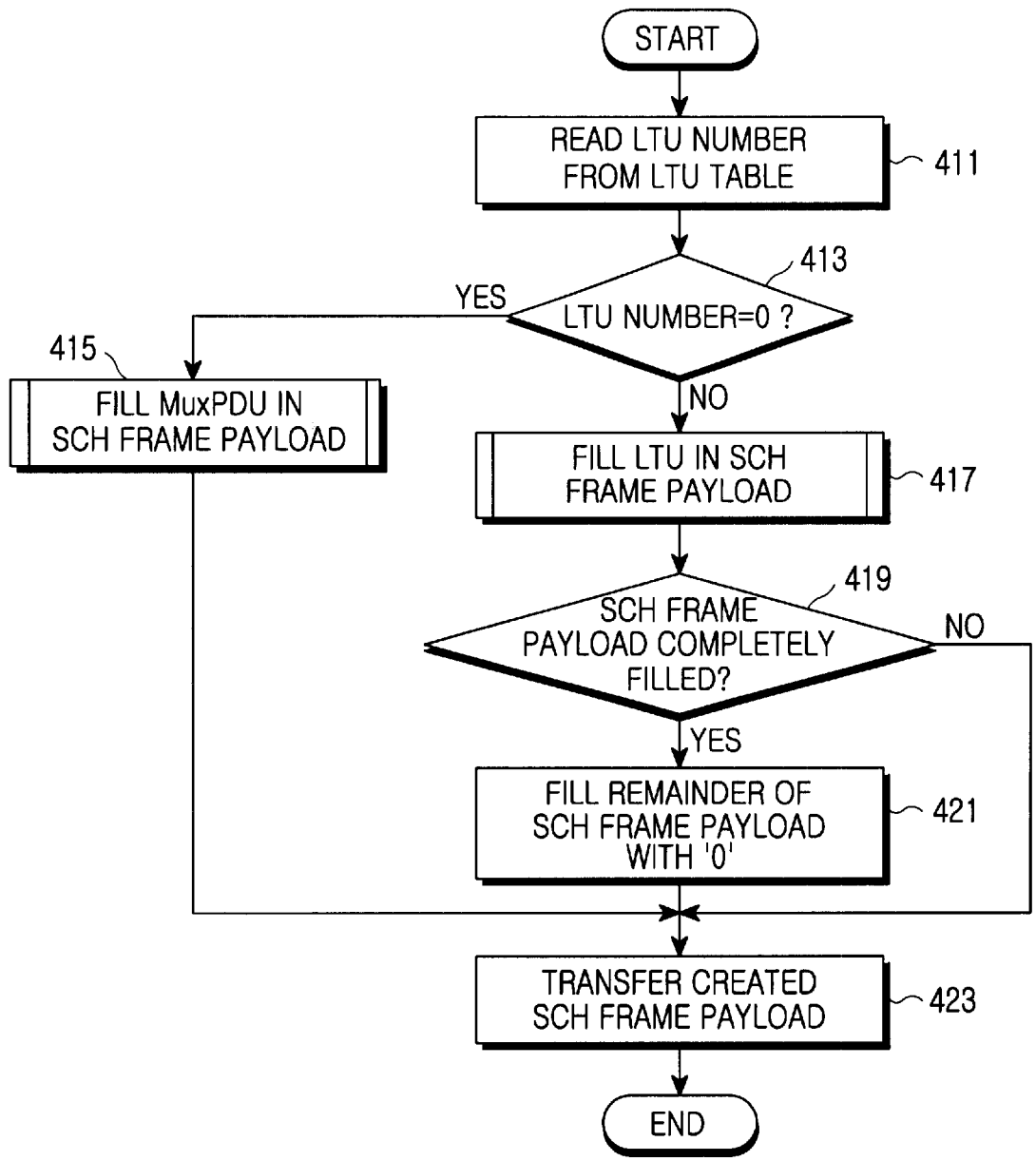
FIG. 4 is a flow chart illustrating a procedure for assembling a supplemental channel frame payload in a CDMA communication system according to an embodiment of the present invention.

FIG. 4 shows a procedure for assembling the payload of a SCH frame in the multiplex sublayer according to an embodiment of the present invention. Referring to FIG. 4, the multiplex sublayer controller 312 reads the number of LTUs according to the data rate of the supplemental channel (SCH) from the LTU table 314, and then stores the read LTU number in the first register 316, in step 411. At step 413, it is determined if the value in the first register 316 is '0'. If the value is '0', it is not necessary to assemble LTUs. Thus, in step 415, the multiplex sublayer controller 312 creates the payload in the same manner as in the existing SCH frame payload creating method. Thereafter, in step 423, the multiplex sublayer controller 312 transfers the created SCH frame payload to the supplemental channel element 313.

Otherwise, if the value stored in the first register 316 is not '0' at step 413, the multiplex sublayer controller 312 proceeds to step 417 to perform a SCH frame payload creating process according to the present invention. After the payload of the SCH frame is filled with LTUs in step 417, the multiplex sublayer controller 312, in step 419, determines whether the payload of the SCH frame is completely filled. If the payload is not completely filled, the multiplex sublayer controller 312 fills the remaining part with '0' bits for padding in step 421, and then proceeds to step 423. Otherwise, if the payload is completely filled, the multiplex sublayer controller 312 transfers the created SCH frame payload to the supplemental channel element 313, in step 423.

Figure 5:
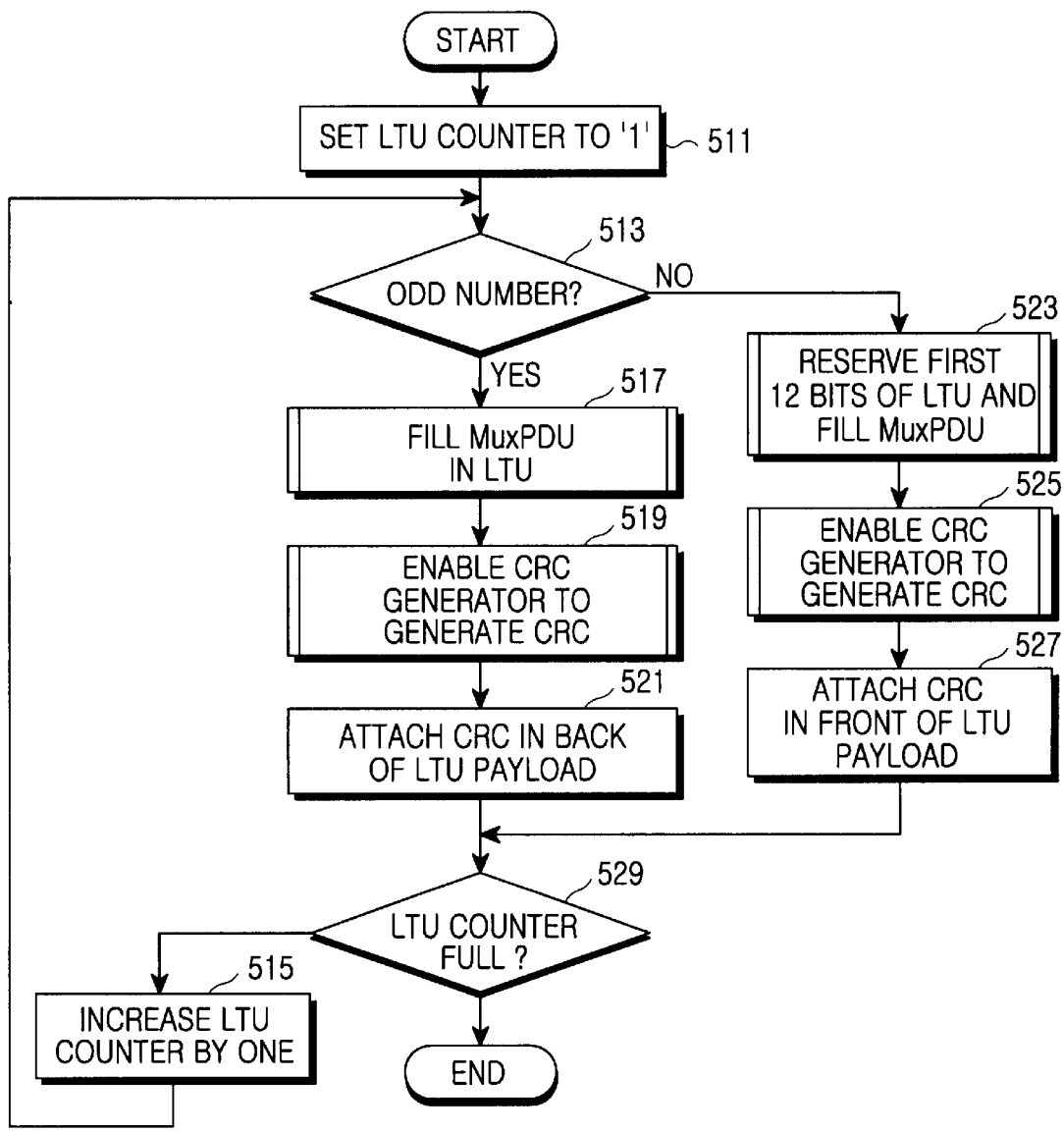
FIG. 5 is a flow chart illustrating a procedure for assembling an LTU in a CDMA communication system according to an embodiment of the present invention.

FIG. 5 shows the LTU assembling process of step 417 in FIG. 4 in greater detail. Referring to FIG. 5, the multiplex sublayer controller 312 sets the LTU counter 315 to '1' in step 511. In step 513, the multiplex sublayer controller 312 determines whether the LTU counter 315 has an odd value. If the LTU counter 315 has an odd value, the multiplex sublayer controller 312 assembles an odd-numbered LTU, starting at step 517; but if the LTU counter 315 has an even value, the multiplex sublayer controller 312 assembles an even-numbered LTU, starting at step 523.

With regard to the odd-numbered LTU assembling process, the multiplex sublayer controller 312 starts filling the LTU with MuxPDUs at the beginning of the LTU in step 517. There is at least one MuxPDU per LTU, and the number of MuxPDUs is determined according to the LTU size. When the payload of the LTU is filled with the MuxPDUs, the multiplex sublayer 312 directs the payload of the LTU to the CRC generator 317 in step 519, thus enabling the CRC generator 317 to calculate the 12 CRC bits for the LTU payload. Once the CRC generator 317 has generated the 12 CRC bits for the LTU payload, the multiplex sublayer controller 312 attaches the 12-bit CRC field in back of the LTU payload in step 521, and proceeds to step 529. Thus, the CRC field of every odd-numbered LTU is at the very end of the LTU.

With regard to the even-numbered LTU composing process, the multiplex sublayer controller 312 starts filling the LTU with MuxPDUs beginning at the 13$^{th}$ bit, in step 523. Thus, the first 12 bits of the LTU are reserved for the CRC field. After filling the LTU payload with MuxPDUs, the multiplex sublayer controller 312 directs the LTU payload to the CRC generator 317 in step 525, thus enabling the CRC generator 317 to calculate the 12 CRC bits for the LTU payload. Once the CRC generator 317 generates the 12 CRC bits for the LTU payload, the multiplex sublayer controller 312 places the 12-bit CRC field in the reserved 12-bit blank in the front of the LTU in step 527, and proceeds to step 529. Thus, the CRC field of every even-numbered LTU is at the very start of the LTU.

Figure 6:
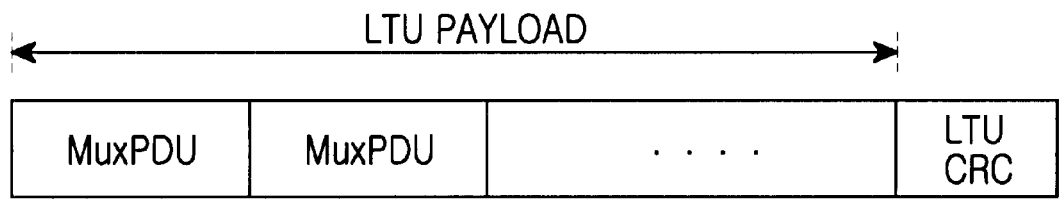
FIG. 6 is a diagram illustrating the structure of a odd-numbered LTU generated in a CDMA communication system according to an embodiment of the present invention.
Figure 7:
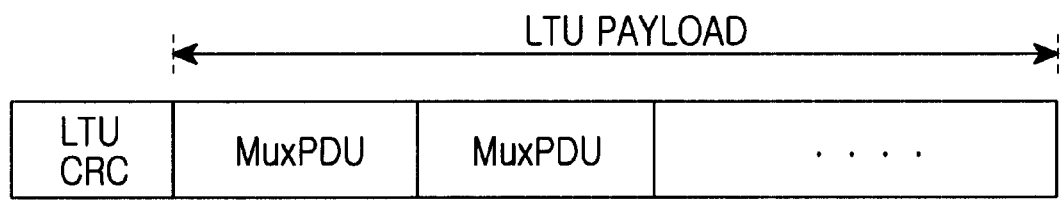
FIG. 7 is a diagram illustrating the structure of an even-numbered LTU generated in a CDMA communication system according to an embodiment of the present invention.

An advantage of creating odd- and even-numbered LTUs in this fashion will be described in reference to FIGS. 6 & 7, before returning to step 529 on FIG. 5. FIGS. 6 and 7 show the odd-numbered LTU and the even-numbered LTU generated in the above procedure. The odd-numbered LTU has the 12-bit LTU CRC field following the LTU payload as shown in FIG. 6, and the even-numbered LTU has the 12-bit LTU CRC field preceding the LTU payload as shown in FIG. 7. By always having the number of LTUs in a SCH frame equal a multiple of 2 (as shown in Table 1), the CRC field of the odd-numbered LTU is always paired with the CRC field of an even-numbered LTU. In this arrangement, since each CRC field is comprised of 12 bits, the two CRCs will equal 3 bytes. Because the MuxPDUs are all aligned based on the length of a byte, it is usually not possible to use a CRC field that has a fraction of byte. However, in the preferred embodiment of the present invention, it is possible to byte-align the starting point of the MuxPDUs by consecutively connecting the two 12-bit, or 1 and a ½ byte, CRCs. Thus, it is possible to byte-align all the MuxPDUs, even though the individual CRC fields are not byte unit based.

Returning to FIG. 5, after the LTU assembling process, the multiplex sublayer controller 312 determines in step 529 whether the required number of LTUs have been assembled. That is, it is determined whether the value of the LTU counter 315 is identical to the value stored in the first register 316. If it is, the multiplex sublayer controller 312 has completed the LTU assembling process, and thus returns to step 419 of FIG. 4. If the LTU counter is not equal to the first register 316 at step 529, the multiplex sublayer controller 312 increases the LTU counter 315 by one at step 515, and returns to step 513 to repeat the above LTU assembling process.

Figure 8:
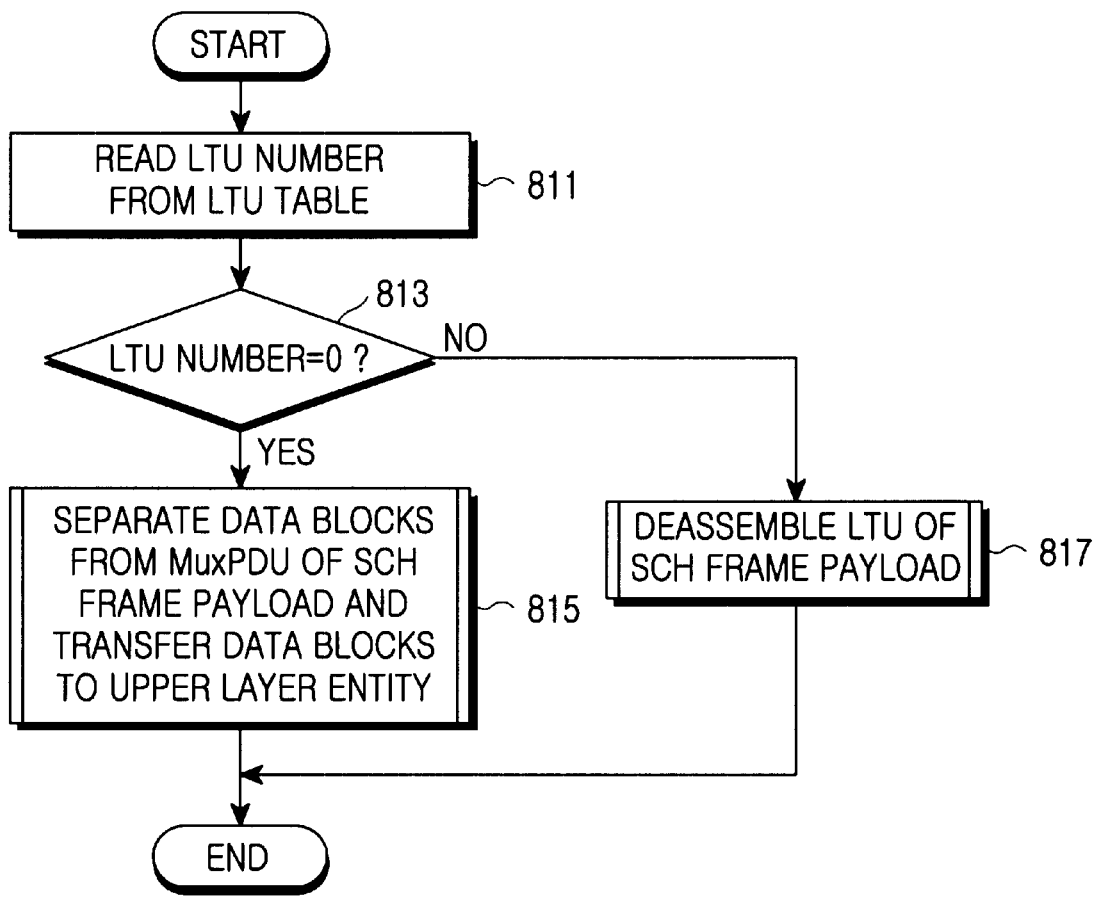
FIG. 8 is a flow chart illustrating a procedure for de-assembling a supplemental channel frame payload in a CDMA communication system according to an embodiment of the present invention.

FIG. 8 shows a procedure for receiving the payload of a SCH frame in the multiplex sublayer according to an embodiment of the present invention. Referring to FIG. 8, the multiplex sublayer controller 312 stores, in step 811, information about the physical layer CRC check results in the second register 318. The supplemental channel element 313 provides the information about the physical layer CRC check results. Also in step 811, the multiplex sublayer controller 312 reads the LTU number suitable for the current data rate of the supplemental channel from the LTU table 314 and stores it in the first register 316. Thereafter, the multiplex sublayer controller 312 determines in step 813 whether the value stored in the first register 316 is '0'.

If the value stored in the first register 316 is '0', the multiplex sublayer controller 312 proceeds to step 815 since it is not necessary to use the LTU function. In step 815, if the second register 318 indicates that the SCH frame payload passed the physical layer CRC check, the multiplex sublayer controller 312 separates the MuxPDUs out from the received SCH frame payload, and then separates data blocks out from the respective MuxPDUs, as is done in the existing SCH frame payload de-assembling method. Thereafter, the multiplexer sublayer controller 312 transfers the separated data blocks to the appropriate upper layer entity (e.g., the RLP layer) destination. If the second register 318 indicates that the SCH frame payload did not pass the physical layer CRC check, the multiplex sublayer controller 312 informs the upper layer entity that a corrupted frame has been received, as in the existing SCH frame payload de-assembling method.

If the value stored in the first register 316 is not '0' at step 813, the multiplex sublayer controller 312 proceeds to step 817 to perform the LTU de-assembling process according to an embodiment of the present invention. The LTU de-assembling process according to an embodiment of the present invention is shown in FIG. 9.

Figure 9:
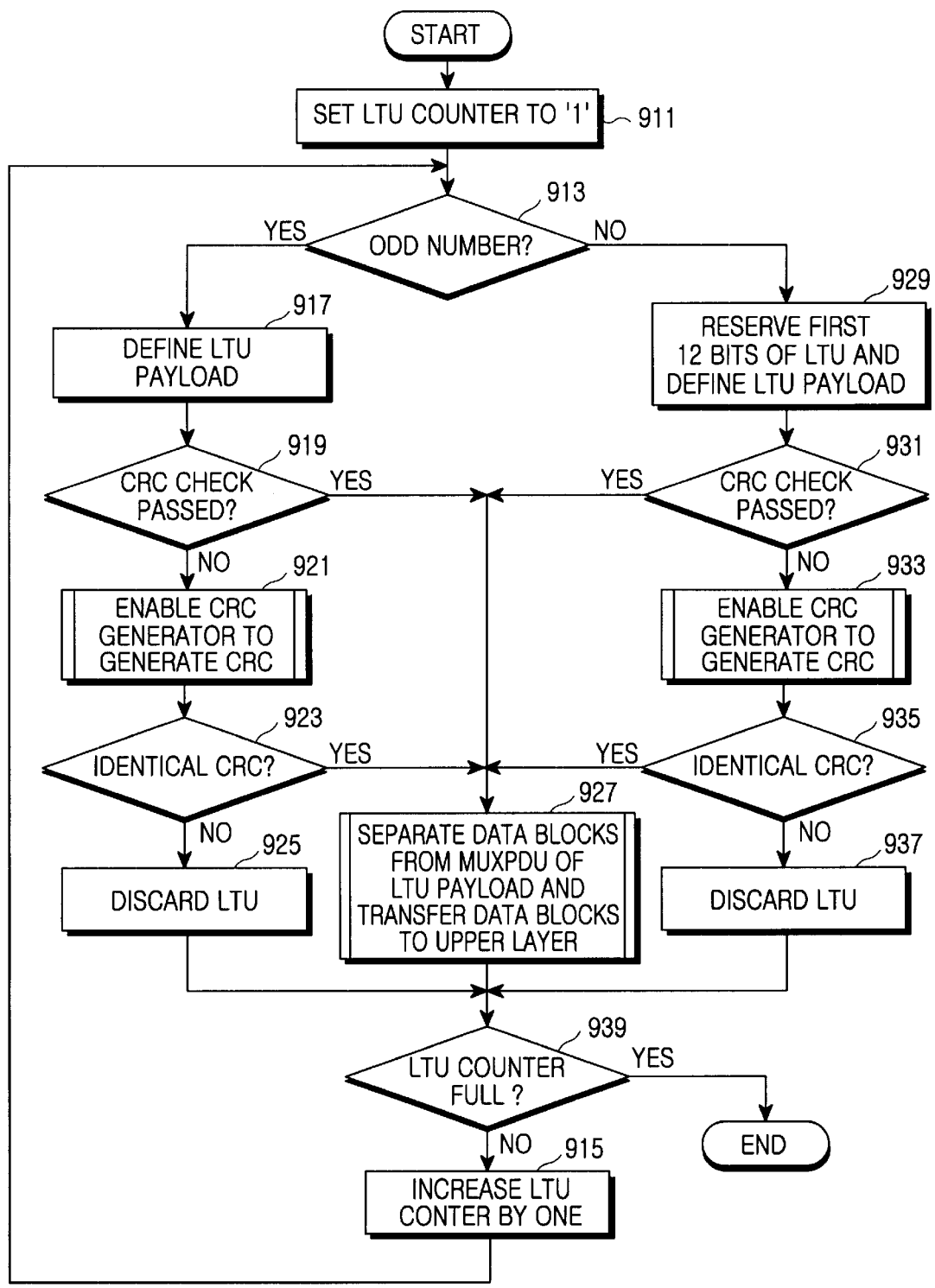
FIG. 9 is a flow chart illustrating a procedure for de-assembling an LTU in a CDMA communication system according to an embodiment of the present invention.

Referring to FIG. 9, the multiplex sublayer controller 312 sets the LTU counter 315 to '1' in step 911. Then the multiplex sublayer controller 312 determines in step 913 whether the LTU counter 315 has an odd value. If the LTU counter 315 has an odd value, the multiplex sublayer controller 312 proceeds to step 917 to perform the odd-numbered LTU de-assembling process; and, if the LTU counter 315 has an even-numbered value, the multiplex sublayer controller 312 proceeds to step 929 to perform the even-numbered LTU de-assembling process.

With regard to the odd-numbered LTU de-assembling process, the multiplex sublayer controller 312 defines the portion in the beginning of the LTU as the LTU payload, and separates out the LTU CRC field at the end, in step 917. Then the multiplex sublayer controller 312 determines in step 919 whether physical layer CRC check was passed by analyzing the output of the second register 318. If the physical layer CRC check is passed, the multiplex sublayer controller 312 proceeds to step 927 to directly de-assemble the LTU into MuxPDUs without performing a LTU CRC check. The MuxPDU de-assembling process is as follows. Because the MuxPDU has a specific size, the multiplex sublayer controller 312 separates out the MuxPDUs from the received payload, then separates out the data blocks from the MuxPDUs, and lastly transfers the separated data blocks to the appropriate upper layer entity. In this example, the upper layer entity is RLP.

If the physical layer CRC check has failed, the multiplex sublayer controller 312 proceeds to step 921 to perform a LTU CRC check on the LTU. That is, the multiplex sublayer controller 312 directs the LTU payload to the CRC generator 317, thus enabling the CRC generator 317 to generate a 12-bit CRC. Thereafter, in step 923, the multiplex sublayer controller 312 determines whether the just-generated 12-bit CRC is identical to the 12-bit LTU CRC field which was received with the present LTU payload. If the CRC bits are identical to each other, the multiplex sublayer controller 312 proceeds to step 927 to directly de-assemble the LTU payload into MuxPDUs. If the CRC bits do not match in step 923, the multiplex sublayer controller 312 proceeds to discard the corrupted LTU in step 925, and then proceeds to step 939.

With regard to the even-numbered LTU de-assembling process, the multiplex sublayer controller 312 separates out the first 12 bits of the LTU as the LTU CRC field and defines the following portion as the LTU payload, in step 929. Thereafter, in step 931, the multiplex sublayer controller 312 determines whether the physical layer CRC check was passed by analyzing the output of the second register 318. If the physical layer CRC check was passed, the multiplex sublayer controller 312 proceeds to step 927 to directly de-assemble the LTU into MuxPDUs without performing a LTU CRC check.

If it is determined the physical layer CRC check has failed in step 431, the multiplex sublayer controller 312 proceeds to step 933 to perform a LTU CRC check on the LTU. That is, the multiplex sublayer controller 312 directs the LTU payload to the CRC generator 317, thus enabling the CRC generator 317 to generate a 12-bit CRC. Thereafter, in step 935, the multiplex sublayer controller 312 determines whether the just-generated 12-bit CRC is identical to the 12-bit LTU CRC field which was received with the current LTU payload. If the CRC bits are identical to each other, the multiplex sublayer controller 312 proceeds to step 927 to directly de-assemble the LTU payload into MuxPDUs. If the CRC bits are not identical, the multiplex sublayer controller 312 proceeds to discard the current LTU in step 437, and then proceeds to step 939.

After either odd-numbered or even-numbered LTU de-assembly or discarding, the process comes to step 439. At step 439, the multiplex sublayer controller 312 determines whether the required number of LTUs have been de-assembled. If the value of the LTU counter 315 is identical to the value stored in the first register 316, the multiplex sublayer controller 312 ends the LTU de-assembly process. If the LTU counter 315 is not identical to the first register 316, the multiplex sublayer controller 312 increases the LTU counter 315 by one in step 915, and returns to step 913 to repeat the LTU de-assembling process for the next LTU.

As described above, the novel LTU assembly and de-assembly method, which uses a 12-bit CRC field according to an embodiment of the present invention, transmits an increased amount of data by reducing the portion occupied by the LTU CRC field and facilitates efficient data transmission and reception through byte alignment.

Although the preferred embodiment used the example of a supplemental channel in a CDMA-2000 system, the present invention can apply to any system having two or more CRC fields in a transmission frame.

While the invention has been shown and described with reference to a certain preferred embodiment, it will be understood by those skilled in the art that various changes in form and details may be made therein without departing from the spirit and scope of the invention as defined by the appended claims.

What is claimed is:

1. A method for arranging CRC (Cyclic Redundancy Code) fields within logical transmission units (LTUs) in a communication system having a physical channel frame including a plurality of LTUs, each having a payload, comprising the steps of:
   calculating a LTU CRC field for each LTU payload;
   placing the LTU CRC field after the payload in odd-numbered LTUs; and
   placing the LTU CRC field before the payload in even-numbered LTUs;
   wherein each odd-numbered LTU CRC field is matched with an even-numbered LTU CRC field.

2. The method as claimed in claim 1, wherein the LTU CRC field is comprised of 12 bits.

3. A method for assembling logical transmission units (LTUs) in a communication system having a physical channel frame including a plurality of LTUs each including a payload, the method comprising the steps of:
   inserting at least one multiplex sublayer protocol data unit (MuxPDU) in the payload;
   generating a LTU CRC field for detecting errors in the payload;
   attaching the generated LTU CRC field after the payload, if assembling an odd-numbered LTU;
   attaching the generated LTU CRC field before the payload, if assembling an even-numbered LTU; and
   inserting the LTUs in the payload of the physical channel frame so that the LTU CRC field of an even-numbered LTU and the LTU CRC field of an odd-numbered LTU is connected to said even-numbered LTU.

4. The method as claimed in claim 3, wherein the odd-numbered LTU assembling step comprises the steps of:
   inserting the at least one MuxPDU according to a size of the payload of the LTU, starting at a beginning of the LTU;
   generating the LTU CRC field from the inserted MuxPDUs; and
   inserting the generated LTU CRC field after the MuxPDUs.

5. The method as claimed in claim 3, wherein the even-numbered LTU composing step comprises the steps of:
   reserving a blank before the payload;
   inserting the at least one MuxPDU according to a size of the payload of the LTU, after the reserved blank;
   generating the LTU CRC field from the inserted MuxPDUs; and
   inserting the generated LTU CRC field in the reserved blank.

6. The method as claimed in claim 3, wherein the generated LTU CRC field is comprised of 12 bits.

7. A data communication method in a communication system, comprising the steps of:
   determining a number of logical transmission units (LTUs) which can be inserted in a payload of a physical channel frame according to a present data rate;
   counting, starting at 1, before starting assembly of an LTU;
   determining whether the current count is an odd number or an even number;
   filling, when the current count is an odd number, a LTU payload with multiplex sublayer protocol data units (MuxPDUs) beginning at a starting point of the LTU, calculating Cyclic Redundancy Code (CRC) bits using the MuxPDUs filling the LTU payload, and attaching the calculated CRC bits after the LTU payload; and
   reserving, when the current count is an even number, a blank field corresponding to a size of calculated CRC bits beginning at the starting point of the LTU, filling MuxPDUs in a LTU payload starting after the blank, calculating the CRC bits using the MuxPDUs in the payload, and inserting the calculated CRC bits in the blank before the LTU payload.

8. A method for de-assembling logical transmission units (LTUs) in a communication system having a physical channel frame including a plurality of LTUs, with a physical layer Cyclic Redundancy Code (CRC) field, each said LTU including a payload and a LTU CRC field for detecting errors in the payload, the method comprising the steps of:
   (a) defining a payload beginning at a starting point of an LTU for an odd-numbered LTU, and performing error checking using a LTU CRC field attached after the payload;
   (b) defining a payload beginning after a reserved blank in an LTU for an even-numbered LTU, and performing error checking using a LTU CRC field inserted in the reserved blank before the payload; and
   (c) separating multiplex sublayer protocol data units (MuxPDUs) from the payload of the LTU, if no errors are detected; then separating out data blocks from said each MuxPDU; and transmitting the separated data blocks to an upper layer entity.

9. The method as claimed in claim 8, wherein step (a) further comprises the steps of:
   determining whether a physical layer frame has passed physical layer CRC checking;
   performing step (c) if the physical layer frame has passed physical layer CRC checking; and
   generating, if the physical layer frame has failed physical layer CRC checking, LTU CRC bits using the payload, comparing the generated LTU CRC bits with the LTU CRC bits attached after the payload; and performing step (c) if the CRC bits are identical to each other, and discarding the LTU if the CRC bits are different from each other.

10. The method as claimed in claim 8, wherein step (b) further comprises the steps of:
    determining whether a physical layer frame has passed physical layer CRC checking;
    performing step (c) if the physical layer frame has passed physical layer CRC checking; and
    generating, if the physical layer frame has failed physical layer CRC checking, LTU CRC bits using the payload; comparing the generated LTU CRC bits with the LTU CRC bits attached before the payload; and performing step (c) if the CRC bits are identical to each other, and discarding the LTU if the CRC bits are different from each other.

11. The method as claimed in claim 8, wherein the LTU CRC field is comprised of 12 bits.

12. A device for assembling logical transmission units (LTUs) in a CDMA communication system having a physical channel frame including a plurality of LTUs, with a physical layer Cyclic Redundancy Code (CRC) field and tail bits arranged after the LTUs, said each LTU including a payload and a LTU CRC for detecting errors in the payload, the device comprising:
    a means for arranging LTU CRC fields included in odd-numbered LTUs after the LTU payload and for arranging LTU CRC fields included in even-numbered LTUs before the LTU payload, so as to generate a physical channel frame payload in such a manner that a LTU CRC field of an even-numbered LTU and a LTU CRC field of an odd-numbered LTU is adjacent to said even-numbered LTU; and
    a supplemental channel element for calculating the physical layer CRC field, for attaching the calculated physical layer CRC field to a physical channel frame payload received from the means for arranging LTU CRC fields; for attaching tail bits to create a physical channel frame comprising the physical channel frame payload, the calculated physical layer CRC field, and the tail bits; and for transmitting the physical channel frame over a supplemental channel.

13. The device as claimed in claim 12, wherein the LTU CRC field is comprised of 12 bits.

14. The device as claimed in claim 12, wherein the means for arranging LTU CRC fields comprises:
    a table for a number of LTUs which can fill a payload of the physical channel frame according to a data rate;
    a CRC generator for calculating LTU CRC bits using the LTU payload; and
    a register for storing physical layer CRC check results.

15. A device for assembling an logical transmission unit (LTU) during data transmission in a CDMA communication system, comprising:
    a first memory for storing a number of LTUs according to a data rate;
    a second memory for storing a number of LTUs to be assembled, which number of LTUs to be assembled is read from the first memory;

a counter for counting the sequence of assembled LTUs;

a Cyclic Redundancy Code (CRC) generator for generating a CRC for error detection of the LTU; and a controller for reading the number of LTUs according to a present data rate from the first memory, for storing the read number of LTUs in the second memory, for assembling as many LTUs as the stored number of LTUs, for attaching a CRC field after a payload of an odd-numbered LTU, and for attaching a CRC field before a payload of an even-numbered LTU.

16. The device as claimed in claim 15, wherein at least one multiple sublayer protocol data unit (MuxPDU) is inserted in the payloads of the LTUs.

17. The device as claimed in claim 15, wherein the CRC field is comprised of 12 bits.

* * * * *